United States Patent
Tovani

[19]

[11] Patent Number: 5,827,022
[45] Date of Patent: Oct. 27, 1998

[54] TIERDOWN FLOORING SYSTEM FOR A PATIENT TRANSPORT AIRCRAFT

[75] Inventor: Ernest Peter Tovani, Englewood, Colo.

[73] Assignee: Air Methods Corporation, Englewood, Colo.

[21] Appl. No.: 660,878

[22] Filed: Jun. 10, 1996

[51] Int. Cl.⁶ .................................................. B60P 7/08
[52] U.S. Cl. ................................ 410/78; 410/8; 410/11; 410/104; 410/105; 244/118.1; 244/118.2; 244/137.1
[58] Field of Search ................................ 410/8–11, 102, 410/104, 105, 96, 77, 78; 244/118.1, 118.2, 137.1

[56] References Cited

U.S. PATENT DOCUMENTS

| | | | |
|---|---|---|---|
| 3,353,780 | 11/1967 | Young | 410/104 |
| 3,478,995 | 11/1969 | Lautzenhiser et al. | 410/104 |
| 3,741,504 | 6/1973 | Alberti et al. | |
| 4,077,590 | 3/1978 | Shorey | |
| 4,153,225 | 5/1979 | Paulsen | |
| 4,388,030 | 6/1983 | Skaale | 410/69 |
| 4,483,499 | 11/1984 | Fronk | 244/118.1 |
| 4,557,648 | 12/1985 | Koch et al. | 410/78 |
| 4,832,185 | 5/1989 | Huber | 244/137.1 X |
| 4,850,769 | 7/1989 | Matthews | 410/105 |
| 4,989,809 | 2/1991 | Arnold | 244/118.1 X |
| 5,201,481 | 4/1993 | Hararat-Tehrani | 410/121 X |
| 5,234,297 | 8/1993 | Wieck et al. | 410/77 |
| 5,310,297 | 5/1994 | Benjamin | 410/77 |
| 5,370,342 | 12/1994 | Nordstrom | 410/92 X |
| 5,486,077 | 1/1996 | Nutting | 410/105 X |
| 5,489,172 | 2/1996 | Michler | 410/105 |
| 5,517,895 | 5/1996 | Sanderson | 89/37.16 |

*Primary Examiner*—Stephen T. Gordon
*Attorney, Agent, or Firm*—Holme Roberts & Owen

[57] ABSTRACT

A flooring system positionable in an aircraft is disclosed. In one embodiment, the flooring system includes a floor platform and at least three tracks positioned about a top surface of the floor platform, the tracks being adapted to receive support members. In particular, three parallel tracks form two track pairs which are capable of receiving one of a first and second support member.

2 Claims, 11 Drawing Sheets

TIERDOWN FLOORING SYSTEM FOR A PATIENT TRANSPORT AIRCRAFT

FIELD OF THE INVENTION

This invention generally relates to a flooring system for use in a patient transport aircraft and, more particularly, to a flooring system having a plurality of tracks capable of interconnecting a plurality of support members having varying widths.

BACKGROUND OF THE INVENTION

The air-medical industry has long recognized the importance of providing effective medical attention to a patient during transport of the patient from the emergency site to a permanent medical facility. As such, an efficiently designed patient transport aircraft interior is a necessity in the air-medical industry. Aircraft interior space that is not well-planned with respect to emergency equipment location, patient location and attendant accessibility to both the equipment and the patient, can be a detriment to effectively treating the patient or patients.

The air-medical industry has also recognized the importance of weight when designing aircraft interiors. In this regard, the components comprising the aircraft interior must be lightweight without sacrificing strength and durability. Aircraft components that are unnecessarily heavy may detrimentally effect the balance and performance of a patient transport aircraft.

In this regard, there is a need for a system of adapting medical equipment, stretchers, and other load members within the interior of an patient transport aircraft that efficiently utilizes available space within the aircraft interior. In addition, the system should be lightweight, strong, easily installable and easily maintainable.

SUMMARY OF THE INVENTION

Accordingly, it is a primary object of the present invention to provide an efficiently designed patient transport medical facility.

It is another object of the present invention to provide a lightweight and durable aircraft interior for use in the air-medical industry.

According to one aspect of the present invention, a flooring system positionable in an aircraft, such as the main cabin area of a patient transport aircraft, is provided. The flooring system may be readily adaptable for use with existing aircraft flooring systems or may be installed in newly manufactured aircraft. In particular, the flooring system of the present invention may be used in existing medical aircraft as a replacement floor or, alternatively, as an overlay to the existing floor in such medical aircraft.

For purposes of receiving support members, the flooring system may include a floor platform and a plurality of parallel tracks positioned about a top surface of the floor platform. In particular, the flooring system of the present invention includes at least three parallel tracks which form two track pairs adapted to receive one of a first and a second support member. In a first mode of use of the tracks, a first and second of the tracks may be used to receive a first support member, while in a second mode of use, the first and a third of the tracks may be used to receive a second support member, the first and second support member having the same width. In another embodiment, three tracks forming two track pairs are adapted to receive first and second support members, the first support member having a width different than the second support member. In this regard, the flooring system of the present invention allows for efficient and flexible use of the aircraft interior, and specifically, the floor platform, as the flooring system may be adapted to receive support members of equal or varying widths.

In one embodiment, for purposes of being capable of receiving such support members, a first of three tracks is laterally displaced a distance C from a second of the three tracks, and the first track is laterally displaced a distance C×N from a third of the three tracks, wherein N is an integer. The tracks may extend longitudinally between the front and back edges of the flooring system and may be parallel and positioned adjacent relative to each other at predetermined intervals.

The floor platform of the present invention may comprise, in one embodiment, a single panel, or, alternatively, in another embodiment, forward and aft sections interconnected to each other by a beam. In instances where the floor platform comprises forward and aft sections, the forward and/or aft section includes at least three tracks which comprise at least two track pairs for receiving one of a first and a second support member, wherein the first support member has a width different than the second support member. Where both the forward and aft sections include such tracks, for purposes of effectively utilizing space on such patient transport aircraft, the tracks of the forward and aft sections are substantially coplanar and coincident.

In another aspect of the present invention, a flooring system having at least one access panel interconnectable and positionable over an opening defined in a floor platform is provided. In this regard, an access panel is positionable to cover either an opening in an existing aircraft floor platform or an opening in a floor platform overlaying the existing aircraft floor. Such access panels may be selectively removable so as to provide access to the maintenance area under the aircraft floor platform. Of importance, the access panel may have at least one track located about the top surface of the access panel, the track being capable of receiving at least one support member. In this regard, a support member may be interconnected to the access panel. Furthermore, for purposes of efficiently utilizing the interior space of the aircraft, a track positioned about the top surface of an access panel may be substantially coplanar and coincident with one of the tracks positioned about the top surface of the floor platform.

In still another aspect of the present invention, an auxiliary loading system is provided. Such a loading system is capable of securing a support member or a patient directly to a floor platform of an aircraft via a pin assembly and/or a plurality of parallel tracks associated with a floor platform. In one embodiment, the auxiliary loading system may include at least one barrel insert interconnectable to the floor platform and a corresponding quick-release tie-down member releasably engagable or lockable with the barrel insert. The quick-release tie-down member may have a closed end capable of interconnecting a support member (e.g., medical equipment) or patient to the floor platform via the barrel insert and the tie-down member. For example, in one embodiment, a patient may be secured to the floor platform by inserting first and second tie-down members into corresponding first and second barrel inserts positioned within the floor platform and extending first and second ends of a strap interconnected to closed ends of the first and second tie-down members about the patient, the strap being capable of extending over a portion of a patient (e.g., chest, legs). As such, the tie-down members and barrel inserts may be used to secure patients and/or objects (e.g., medical equipment) to the floor platform.

DETAILED DESCRIPTION

FIGS. 1–11 illustrate a flooring system embodying features of the present invention, the flooring system being capable of use in an aircraft, such as a patient transport aircraft. In the embodiment illustrated in FIGS. 1–11, the flooring system 10 is positionable within the main cabin area of a patient transport aircraft. As such, the flooring system may be used as a replacement floor, or alternatively, in another embodiment (not shown), as an overlay interfacable with an existing floor.

Figure 1:
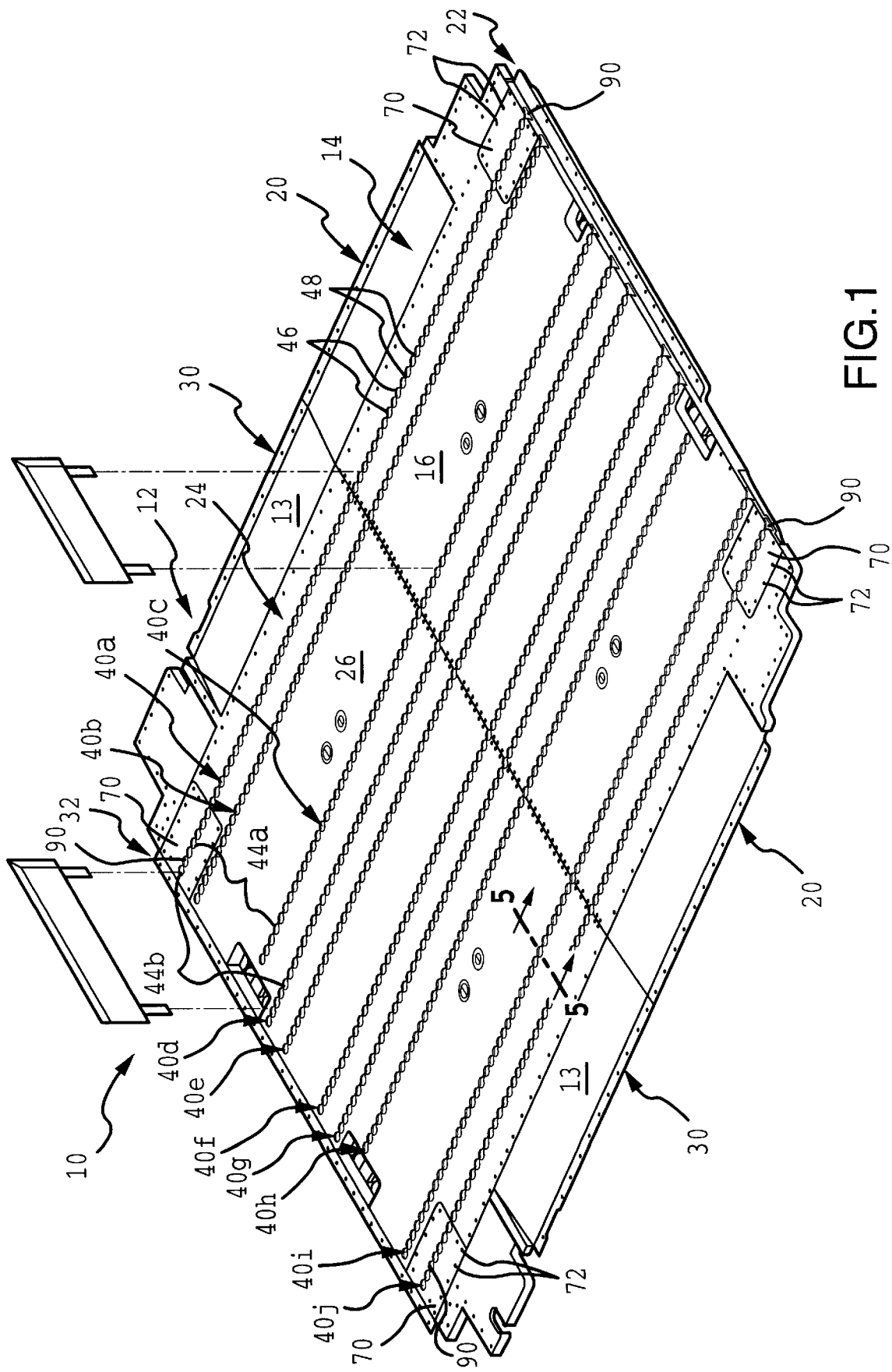
FIG. 1 is a perspective view of the floor system of the present invention.

Referring to FIG. 1, in one embodiment, the floor system 10 includes a floor platform 12 having forward and aft sections 14, 24 and top surfaces 16, 26 and bottom surfaces 18, 28, of the forward and aft sections 14, 24, respectively. Each of the forward and aft sections 14, 24 of the floor platform 12 also have laterally displaced side edges 20, 30, respectively, thus forming a floor platform 12 having longitudinally displaced front and back edges 22, 32, respectively. The floor platform 12, and specifically, the forward and aft sections 14, 24 are interconnected to the frame of the aircraft via a plurality of AN style fasteners about the perimeters of the forward and aft sections 14, 24. The forward and aft sections are interconnectable to each other via a beam 50 (which will be described in more detail hereinbelow).

For purposes of receiving and securing at least one support member (e.g., hardware, such as medical equipment, seats, patient platforms, military equipment for military-style aircraft) on the floor platform 12, the floor system 10 also includes a plurality of tracks 40 capable of receiving support members thereon. In one embodiment, illustrated in FIGS. 1–4, at least three tracks 40a, 40c, 40d are positioned about the top surfaces 16, 26 of the forward and aft sections 14, 24 of the floor platform 12 to form at least two track pairs 44a, 44b which are adapted to receive a first or a second support member, wherein the first support member has a width different than the second support member. As such, a floor platform 12 according to the present invention is capable of securing thereto support members of varying widths, the support members having attachment members interconnectable to the floor platform 12 (e.g., commercially available ANCRA-style fittings attached to the support members, the ANCRA-style fittings being receivable and securable within the tracks 40).

In one embodiment, a first track 40d is laterally displaced from the second track 40c a distance C and laterally displaced from the third track 40a a distance of C×N, where N is an integer. More specifically, where support members typically have a width of about 12 inches or about 15 inches, as in the case in the United States, the first track 40d is displaced 3 inches from the second track 40c and is displaced 15 inches from the third track 40a. In this regard, first and second support member having widths, as defined by the distance between attachment members (e.g., ANCRA-style fittings) for interconnecting the tracks 40 and the support members, of about 12 inches and 15 inches, respectively, are interconnectable to the floor platform 12 via only three tracks, specifically tracks 40a, 40c, 40d which form two track pairs 44a, 44b. For example, a first support member having a width of 12 inches may be interconnected to the floor platform 12 via the first track pair 44a (e.g., tracks 40a and 40c) while a second support member having a width of 15 inches may be interconnected to the floor platform 12 via the second track pair 44b (e.g., tracks 40a and 40d). As such, only three tracks are required to secure two support members having different widths to the floor platform 12.

Figure 2:
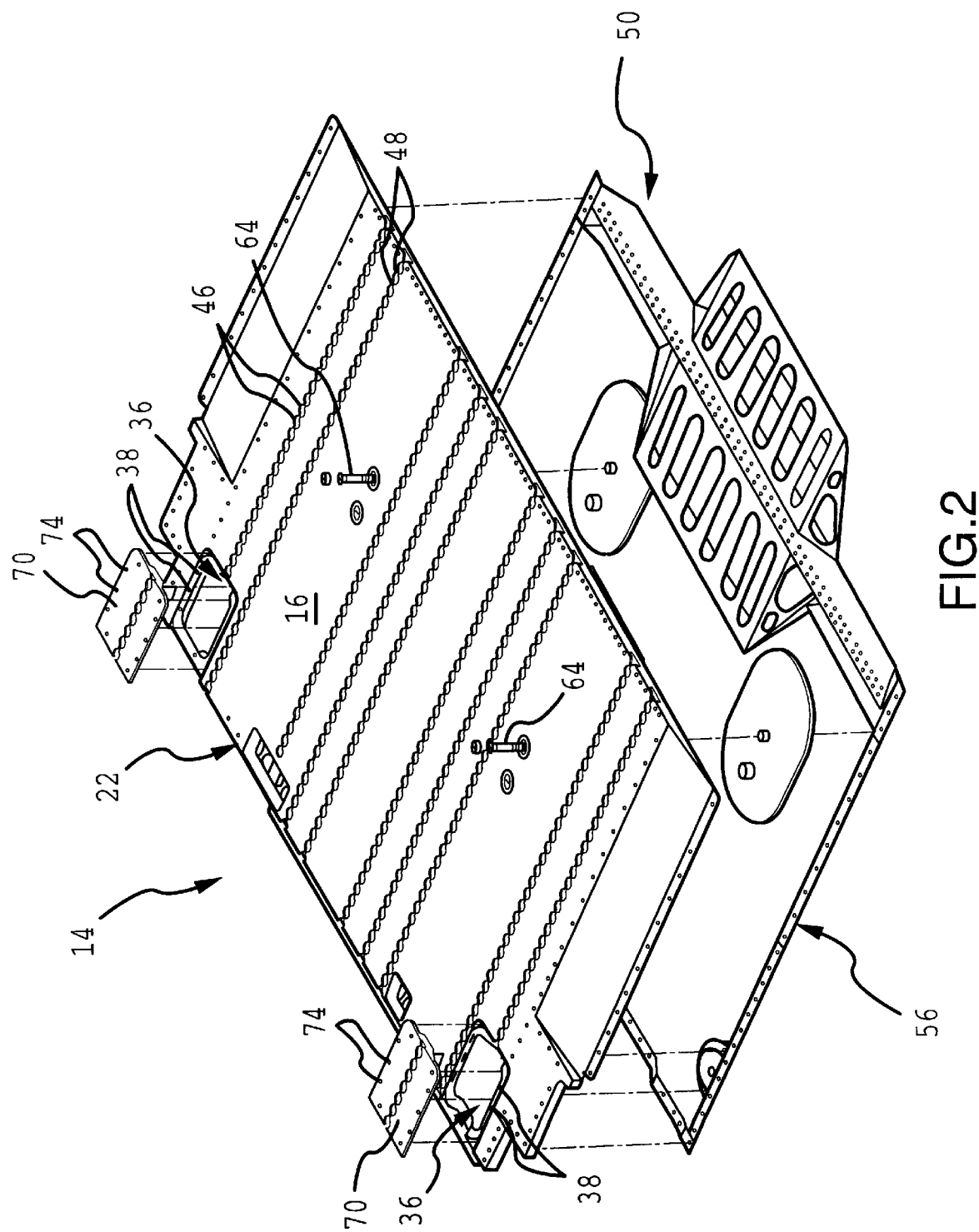
FIG. 2 is an exploded perspective view of the forward section of the flooring system illustrated in FIG. 1.
Figure 3:
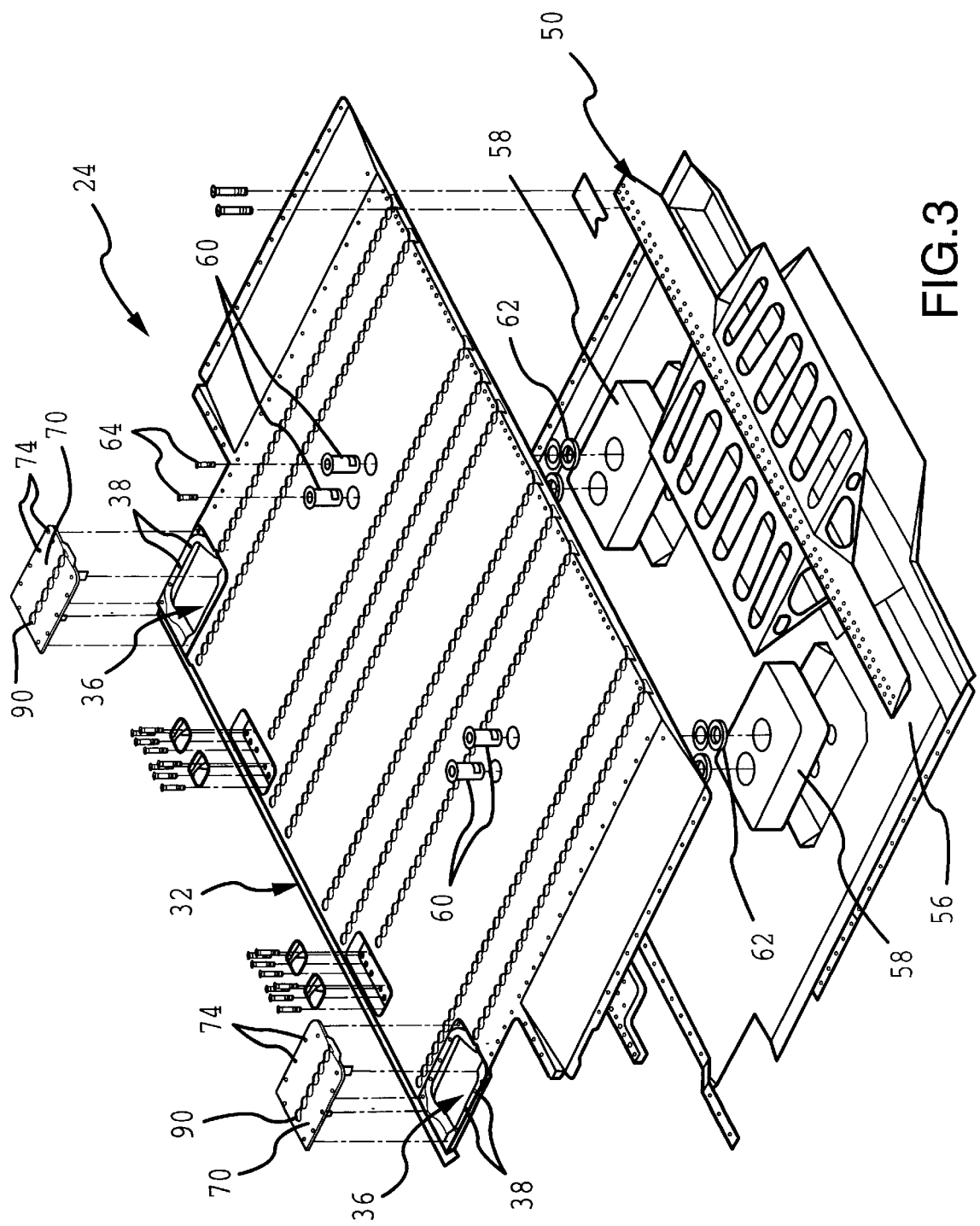
FIG. 3 is an exploded perspective view of the aft section of the flooring system illustrated in FIG. 1.
Figure 4:
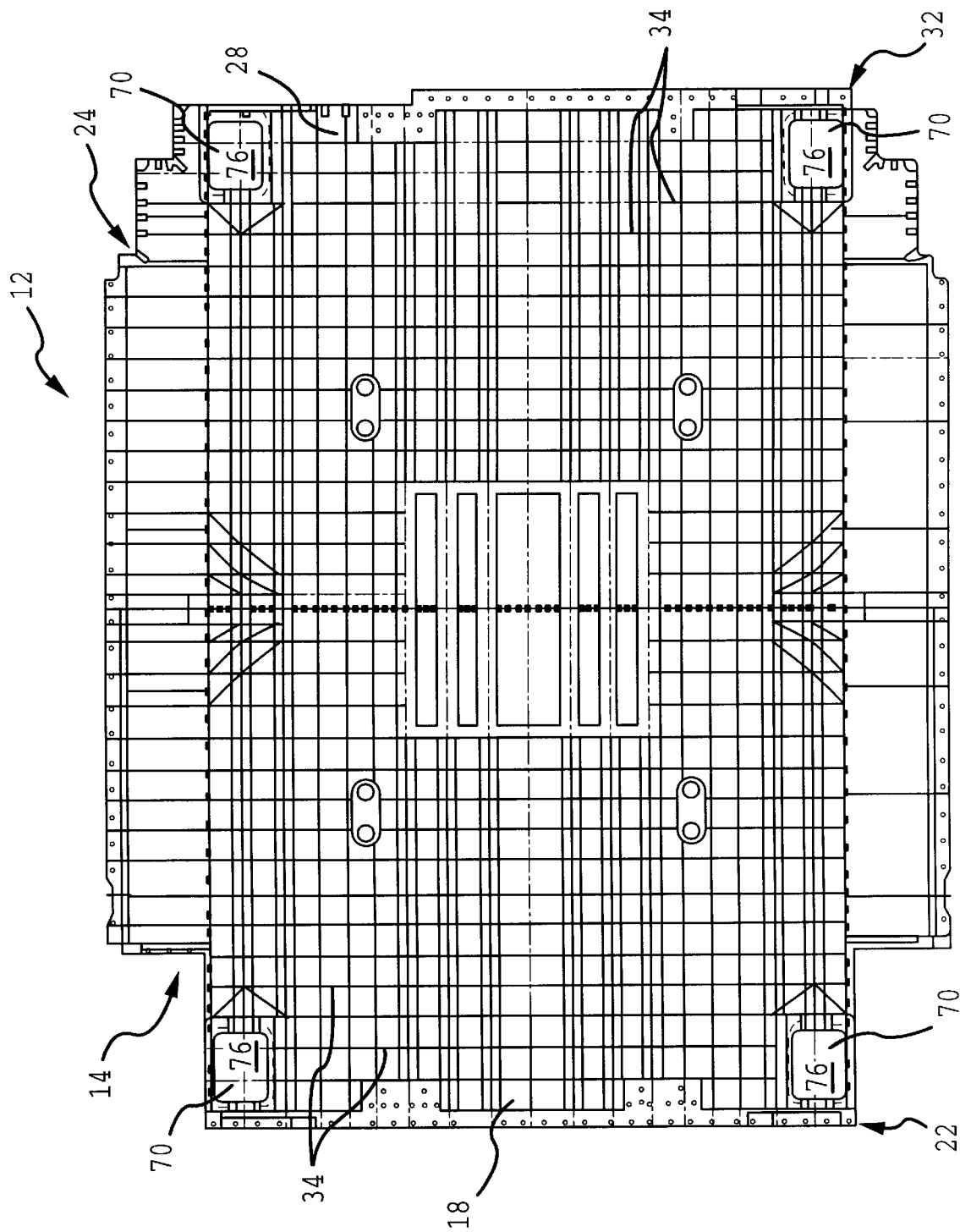
FIG. 4 is a bottom plan view of the bottom surface of the floor platform illustrated in FIG. 1.

In the embodiment illustrated in FIGS. 1–3, the floor platform 12 includes 10 tracks 40a–40j capable of receiving a plurality of support members. For purposes of being capable of receiving a number of support members of equal or varying widths, as defined by the distance between attachment members for interconnecting the support members to the floor platform 12, (e.g., 3 inches, 6 inches, 9 inches, 12 inches, 15 inches, 18 inches etc.), the tracks 40a–40j may be laterally displaced relative to each other by multiples of 3 inches, substantially as described hereinabove (e.g., C×N). Such displacement of the parallel tracks 40a–40j is particularly useful in the United States, where support members are typically 12 inches or 15 inches. As such, various combinations of track pairs may be used to attach support members.

In the embodiment illustrated in FIG. 1, track 40b is located about 3 inches from track 40a, track 40c is located about 12 inches from track 40a, track 40d is located about 15 inches from track 40a, track 40e is located about 18 inches from track 40a, track 40f is located about 24 inches from track 40a, track 40g is located about 27 inches from track 40a, track 40h is located about 30 inches from track 40a, track 40i is located about 39 inches from track 40a and track 40j is located about 42 inches from track 40a. As such, a support member having a width of 15 inches, as defined by the lateral distance between attachment members for interconnecting the support member to the floor 12, is interconnectable to the floor platform 12 via tracks 40a and 40d, tracks 40*b* and 40*e*, tracks 40*c* and 40*g*, tracks 40*d* and 40*h*, tracks 40*f* and 40*i*, and tracks 40*g* and 40*j*. In addition, for purposes of securing a support member having a width of 12 inches, as defined by the lateral distance between attachment members for interconnecting the support member to the floor 12, tracks 40*a* and 40*c*, tracks 40*b* and 40*d*, tracks 40*c* and 40*f*, tracks 40*d* and 40*g*, tracks 40*e* and 40*h*, tracks 40*g* and 40*i* and tracks 40*h* and 40*j*. In this regard, the floor system 10, and specifically, the tracks 40 positioned about the floor platform 12, provide numerous options for placement of one or more support members within the interior of an aircraft. For example, three tracks can be utilized in first and second modes of use to receive one or more support members having a width of 12 inches. Specifically, tracks 40*b* and 40*d* may be used in one mode of use to receive a support member having a width of 12 inches, while, in a second mode of use, tracks 40*d* and 40*g* may be used to receive the same or a different 12 inch wide support member. As such, space within the interior of the aircraft may be efficiently utilized.

Figure 5:
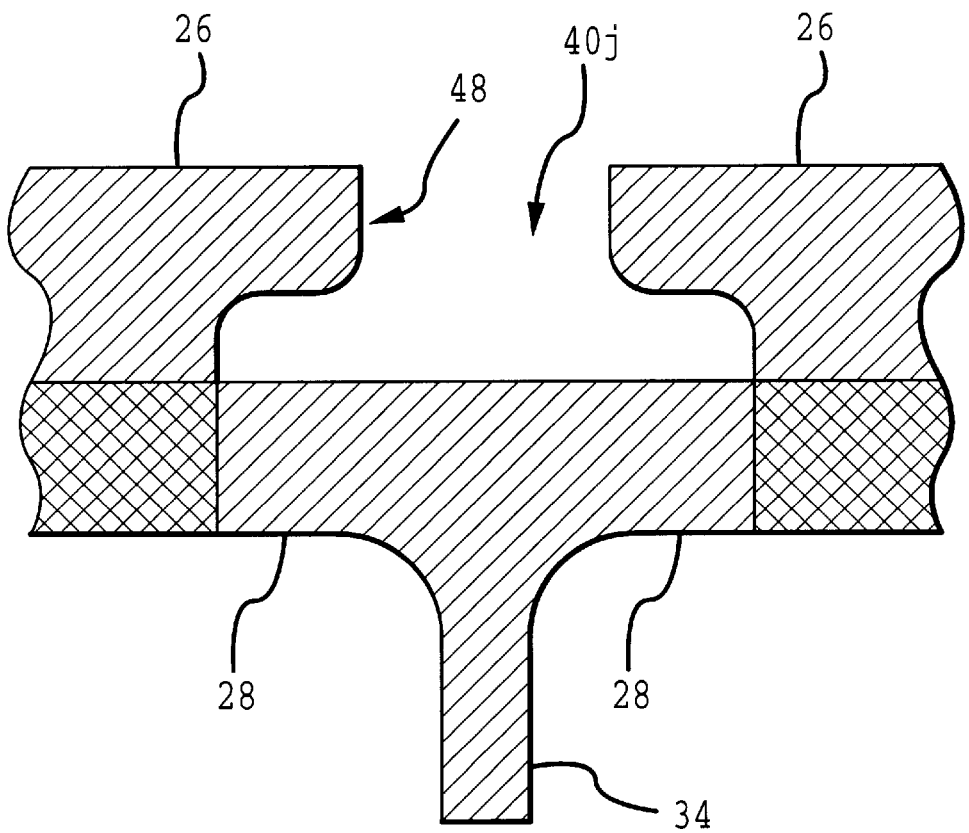
FIG. 5 is a cross-sectional view of the track of the floor platform illustrated in FIG. 1 taken along line 5—5.

For purposes of securing support members to the floor platform 12, the tracks 40 may be positioned within or above the top surfaces 16, 26 of the floor platform 12. In one embodiment, illustrated in FIGS. 1 and 5, the tracks 40 (e.g., 40*j*) are integrally formed within the floor platform 12, substantially below the top surface 26 of the floor platform 12. The tracks 40, illustrated in FIG. 5, are configured according to Mil. Spec. 33601 to receive and secure ANCRA-style fittings, which may be either spring-loaded fittings or screw down fittings. In this regard, such ANCRA-style fittings may be inserted into the tracks 40 in areas 46 of the track 40 having a wide diameter, and such fittings may be secured to the track 40 in areas 48 of narrow diameter.

In addition to being adapted to secure support members to the floor platform 12, the tracks 40*a*–40*j* are capable of containing and channeling blood and other fluids. More specifically, a single track 40 (e.g., 40*e*) is capable of containing about 40 fluid ounces of blood or other liquid. As such, the tracks 40 are capable of channeling blood or other liquid to the rear of the aircraft to facilitate cleaning of the floor platform 12. For purposes substantially inhibiting the absorption of biocontaminates into the floor platform 12, the floor platform 12 and tracks 40 integrally formed therein may be fabricated from a material selected from the group consisting of aluminum, titanium, honeycomb and composites. For purposes of facilitating loading and cleaning of the interior of the aircraft, in the embodiment illustrated in FIG. 1, the floor platform 12 also includes inclined side panels 13.

Figure 7:
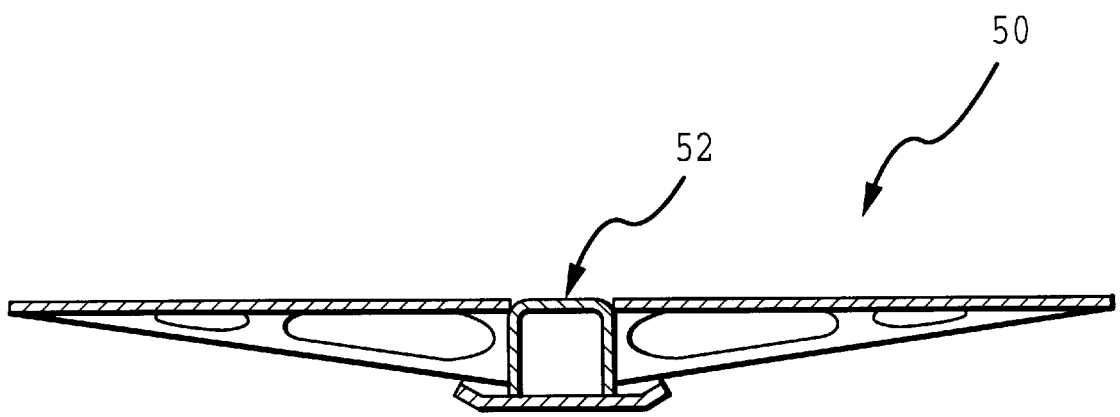
FIG. 7 is a cross-sectional view of the center beam illustrated in FIG. 6 taken along line 7—7.
Figure 6:
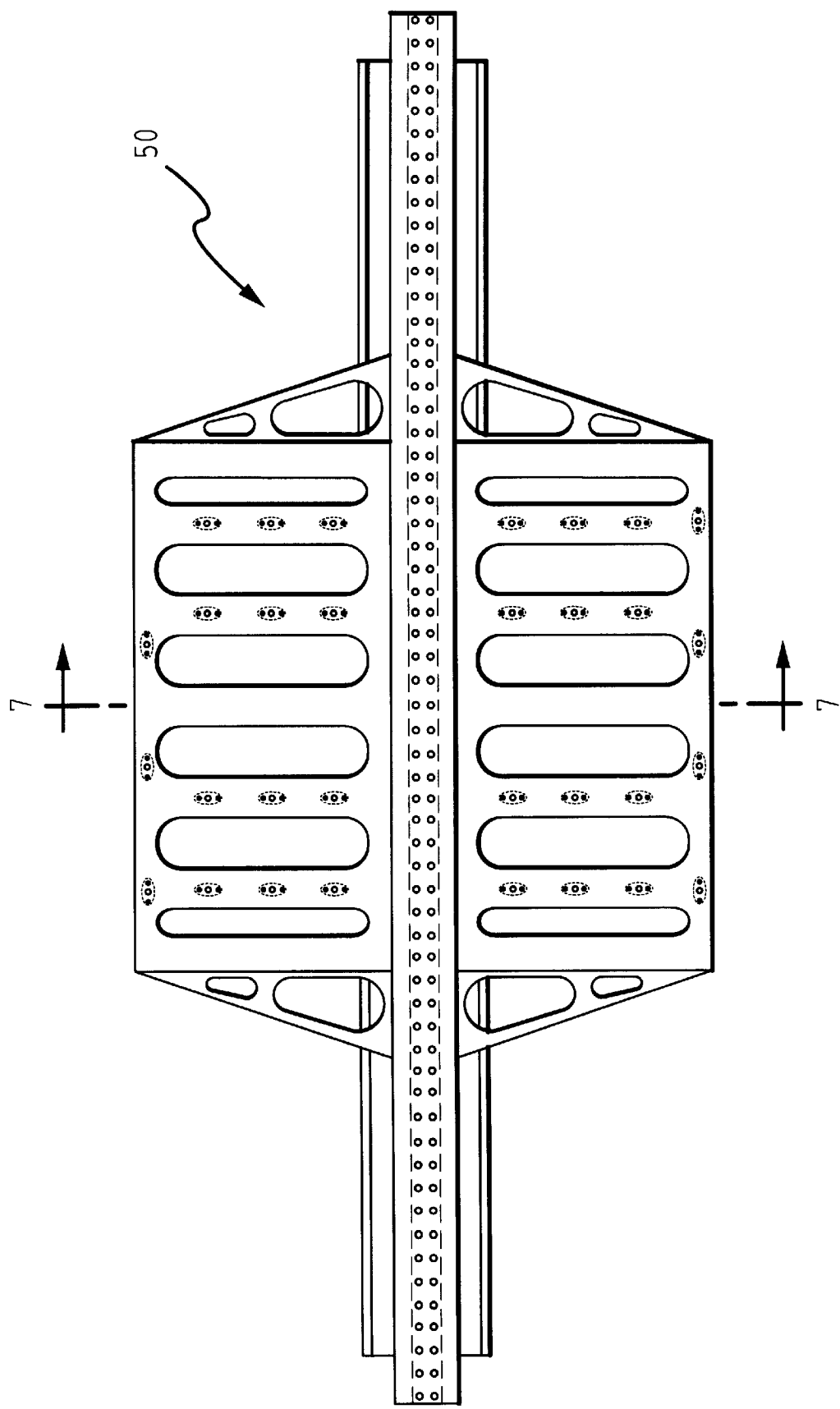
FIG. 6 is a top plan view of the center beam for interconnecting forward and aft sections of the floor platform illustrated in FIG. 1.
Figure 8:
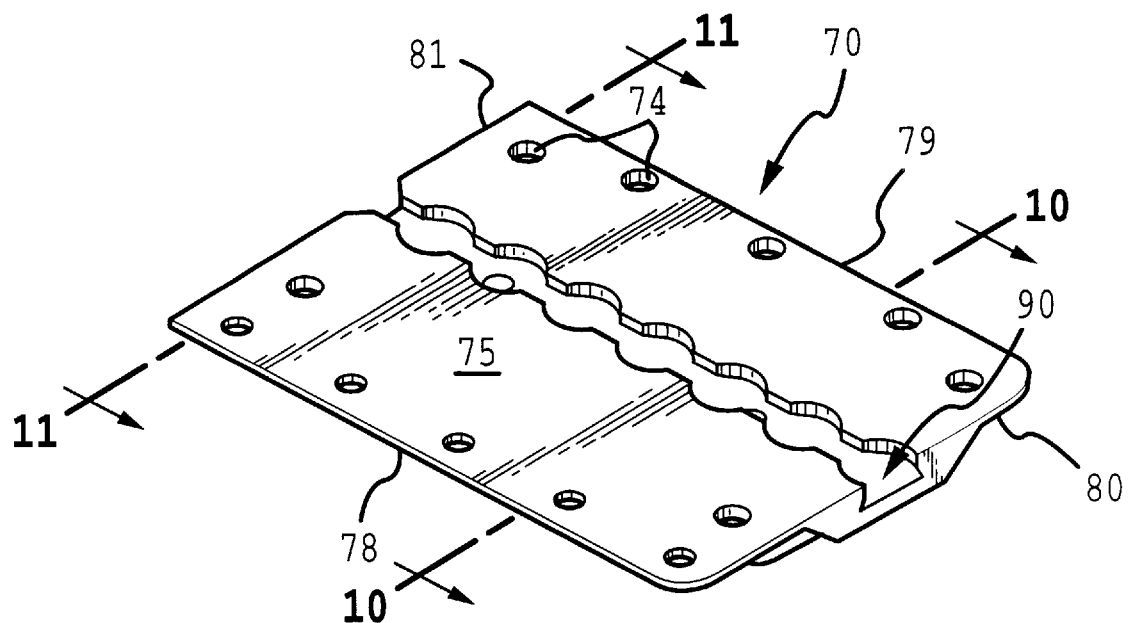
FIG. 8 is a perspective view of the top of an access panel illustrated in FIG. 1.
Figure 9:
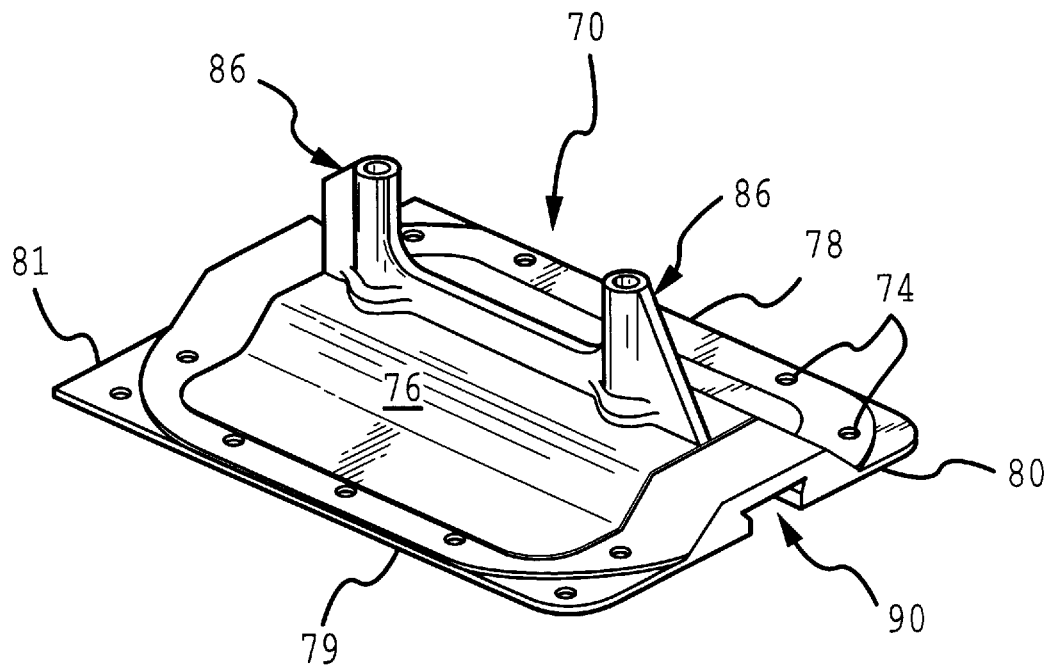
FIG. 9 is a perspective view of the bottom of the access panel illustrated in FIG. 8.

As noted hereinabove, in one embodiment of the floor platform 12, the floor platform 12 includes forward and aft sections 14, 24 which are interconnected together to form the floor platform 12 via a beam 50, illustrated in FIGS. 2–3 and 6–7. The beam 50 primarily functions to provide bending and/or torsional resistance to the floor platform 12, as the floor platform 12 is subject to bending and torsional loading. As such, the beam 50 is interconnected to the forward and aft sections 14, 24 of the floor platform 12 via a plurality of fasteners (e.g., #10 flush head bolts) and nut plates (e.g., NAS1474F3 nut plates) and is not interconnected to the frame of the aircraft in this embodiment. As such, the beam 50 floats to avoid translation of loads from the beam 50 directly into the frame of the aircraft. In order to securely interconnect the forward and aft sections 14, 24 and to provide resistance to bending and torsional loading, the beam 50 may be fabricated from a stiff, high strength material, such as a material selected from the group consisting of 4340 steel, titanium, beryllium or a composite, such as fiberglass epoxy or boron epoxy. In addition, and as shown in FIG. 7, the beam 50 may have a closed cell section 52 to provide enhanced stiffness and resistance to bending and torsional forces.

In some types of aircraft (e.g., helicopters), a fuel bladder for containing fuel is located below the floor platform 12. In one embodiment, illustrated in FIGS. 2–5, where the floor platform 12 is fabricated (e.g., milled) from a block of metal, such as titanium or aluminum, the bottom surfaces 18, 28 of the forward and aft sections 14, 24 may be somewhat abrasive to softer materials, especially in view of the numerous ribs 34 which provide enhanced strength characteristics to the floor platform 12 while providing a lightweight structure. In view of such abrasive surfaces, an anti-chafe barrier 56 is interconnected between the bottom surfaces 18, 28 of the forward and aft sections 14, 24 and the fuel bladder (not shown) to substantially inhibit frictional contact between the bottom surfaces 18, 28 and the fuel bladder. In the embodiment illustrated in FIGS. 3, in order to interconnect the floor platform 12 and the anti-chafe barrier 56 such that any fuel in the fuel bladder cannot excessively slosh about the fuel bladder, standoff panels 58 may be used to provide an adequate space between the anti-chafe barrier 56 and the fuel bladder. In this regard, the anti-chafe barrier 56 may be interconnected to the aft section 24, as illustrated in FIG. 3, via a plurality of fasteners 64 capable of being received within inserts 60, which cooperate with jam nuts 62 secure the standoff panels 58 between the aft section 24 and the anti-chafe barrier 56. The anti-chafe barrier 56 may be interconnected to the forward section 14 in a similar fashion. In one embodiment of the invention, the anti-chafe barrier 56 is fabricated from Kevlar™, alternatively, a plastic, such as polyurethane.

For purposes of facilitating access to and/or maintenance of systems and equipment located below the floor platform 12, the floor platform 12 may be provided with a plurality of access holes or openings 36. In one embodiment, illustrated in FIGS. 1–3 and 8–11, the floor platform 12 includes a corresponding plurality of access panels 70, interconnectable to the floor platform 12, to cover the access openings 36. More specifically, the access panels 70 are interconnectable with the floor platform 12 via a plurality of fasteners 72 (e.g., NAS1581K3) and nut plates (e.g., NAS1474F3) (not shown). The fasteners 72 are insertable through bores 74 in the access panels 70 and through the bores 38 in the floor platform 12 and engagable with nut plates to secure the access panels 70 to the floor platform 12. In a preferred embodiment, the fasteners 72 are selectively removable to facilitate access to the underside of the floor platform 12. In this embodiment, each access panel 70 is generally rectangular in cross-section, having top and bottom surfaces 75, 76, laterally displaced side edges 78, 79 and longitudinally displaced front and back edges 80, 81. Alternatively, the access panels may be circular, square or triangular in cross-section. In addition, as the fuel bladder (not shown) is typically located below the floor platform 12, the access panels 70 include supports 86 for supporting fuel bladder vents (not shown).

Figure 10:
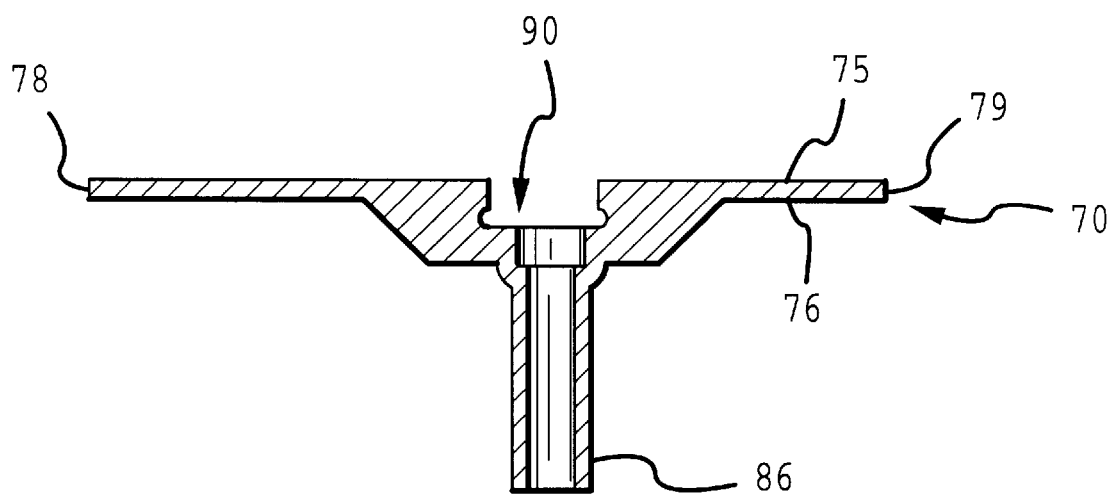
FIG. 10 is a cross-sectional view of the access panel illustrated in FIG. 8 taken along line 10—10.
Figure 11:
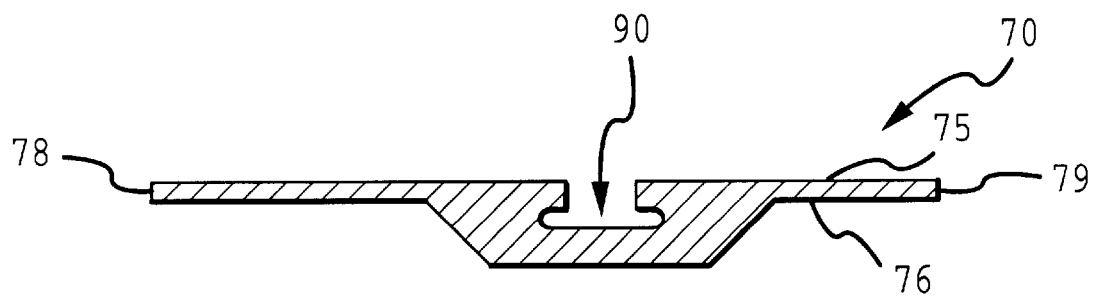
FIG. 11 is a cross-sectional view of the access panel illustrated in FIG. 9 taken along line 11—11.
Figure 12:
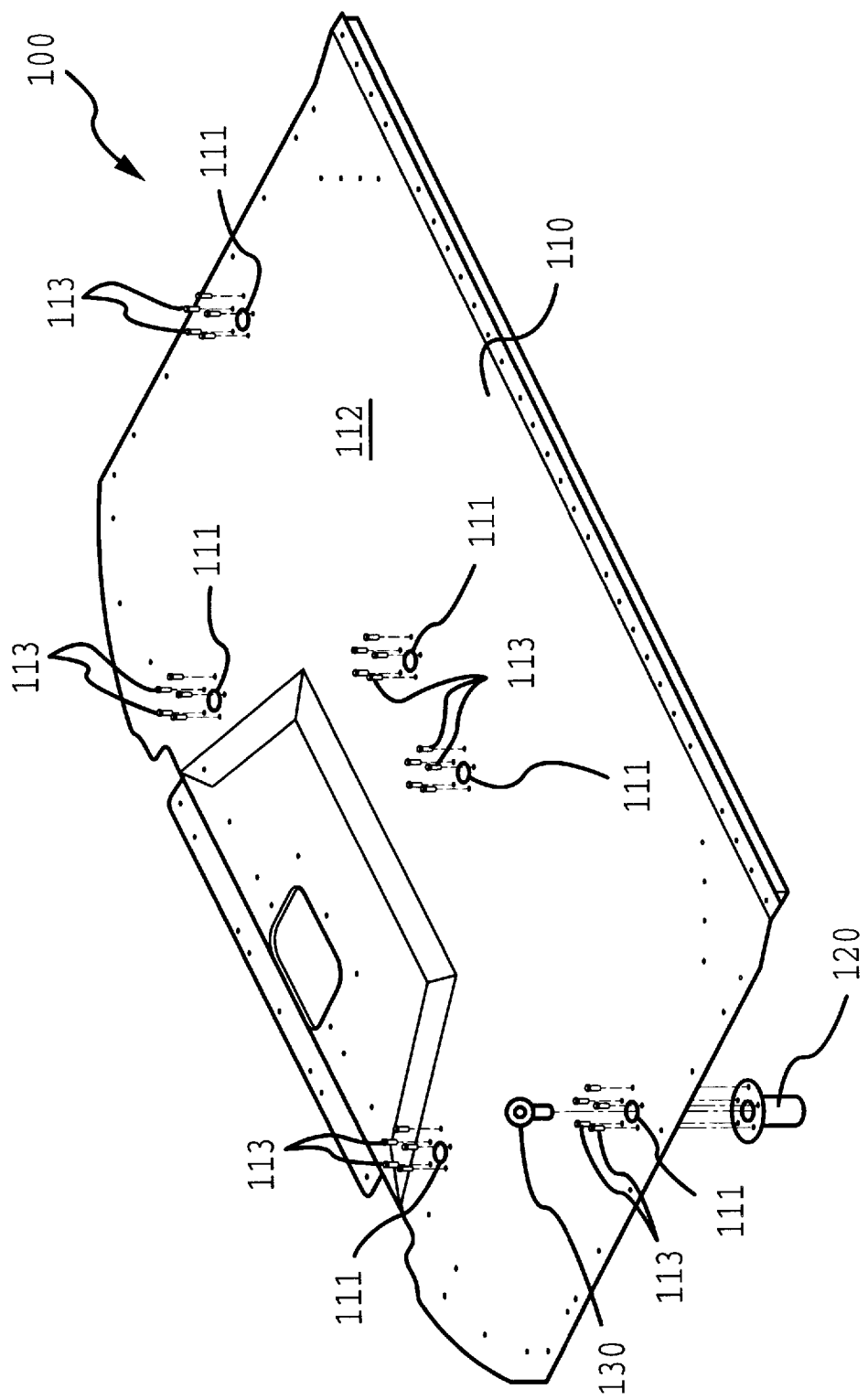
FIG. 12 is an exploded perspective view of a cargo floor platform for supporting an auxiliary loading system.

As illustrated in FIGS. 1–2 and 8–11, for purposes of optimizing utilization of space in the aircraft, the access panels 70 include a track 90, positioned about the top surface 75 of the access panel 70, for securing a supporting member (e.g., medical equipment) thereto. In one embodiment, the access panel 70 is countersunk so as to be coplanar with the floor platform 12. Furthermore, for purposes of facilitating and enhancing utilization of the limited space in the aircraft, the tracks 90 associated with the access panels 70 are coincident with the tracks 40 associated with the floor platform 12, and have a similar cross-sectional configuration, as shown in FIGS. 10–11. In this regard, in one embodiment, the tracks 90 are integrally formed in the access panels 70, below the top surface 75 of the access panels 70, and aligned with tracks 40 associated with the floor platform 12, such that support members are positionable proximate the front and back edges 22, 32 of the floor platform 12. As such, the tracks 90 associated with the access panels 70 function as extensions of the tracks 40 associated with the floor platform 12. Thus, this design efficiently utilizes the available space within the aircraft interior while providing for easy maintenance and access to the area under the existing floor of the aircraft.

Referring now to FIGS. 12–16, in another aspect of the present invention, an auxiliary loading system 100 is provided to secure a support member and/or a portion of a patient to a floor in an aircraft. More specifically, in one embodiment, the auxiliary loading system 100 interfaces with a cargo floor platform 110, which is located aft the main cabin floor platform 12 described hereinabove. For purposes of securing a support member (e.g., medical equipment) or a portion of a patient to the cargo floor platform 110, the auxiliary loading system 100 includes a barrel insert 120, interconnectable to the platform 110, and a quick release tie-down member 130, which is releasably engagable with the barrel insert 120 and interconnectable with a support member and/or a strap 150, which will be described in more detail hereinbelow.

As illustrated in FIGS. 12–15, for purposes of anchoring a support member or patient to the cargo floor 110, the tie-down member 130 is selectively and releasably engagable with the barrel insert 120. In order to provide a means by which the tie-down member 120 releasably engages the barrel insert 120, in one embodiment, the cylindrical barrel insert 120 includes a barrel bore 122, a washer 124, a compression spring 126 and a pin 128. The washer 124 and spring 126 are captured within the bore 122 of the barrel insert 120, distal the pin 128, via a cap 125, which threadedly engages a distal portion 121 of the barrel insert 120. Of importance, the pin 128 is fixed within the bore 122 of the barrel insert 120 such that the pin 128 extends across the bore 122. In this regard, the pin 128 is positioned to selectively engage the tie-down member 130, and specifically a j-slot 134 formed in a shaft portion 132 of the tie-down member 130. As such, for purposes of releasably interlocking the tie-down member 130 with the barrel insert 120, a distal end 136 of the tie-down member 130 is insertable into a proximal portion 123 of the barrel insert 120, proximate the top surface 112 of the cargo floor platform 110, in a male-female relation.

In order to releasably secure the tie-down member 130 to the barrel insert 120 such that a support member or patient may be secured to the floor 110, an operator may insert the tie-down member 130 into the barrel insert 120, and may rotate the tie-down member 130, if necessary, relative to the pin 128 of the barrel insert 120 such that the pin 128 is receivable within (e.g., enters) the j-slot 134 of the tie-down member 130. As the tie-down member 120 is moved distally, toward the cap 125 of the barrel insert 120, the distal end 136 of the tie-down member 130 abuttingly engages the washer 124 to compress the spring 126 between the washer 124 and the cap 125. In this regard, the pin 128 is receivable within the j-slot 134, and specifically, within a proximal, laterally extending portion 138 of the j-slot 134 upon distal movement of the tie-down member 130 and rotation of the tie-down member 130 relative to the barrel insert 120. Upon rotation of the tie-down member 120 such that the pin 128 is positioned proximate a j-slot recess 140, the tie-down member 130 may be released by the operator, such that the pin 128 is captured within the recess 140 due to the force applied by the spring 126 against the distal portion 136 of the tie-down member 130, the spring 126 being in compression. Thereafter, support members and/or a patient are interconnectable with the cargo floor platform 110 via the auxiliary loading system 100.

Figure 13:
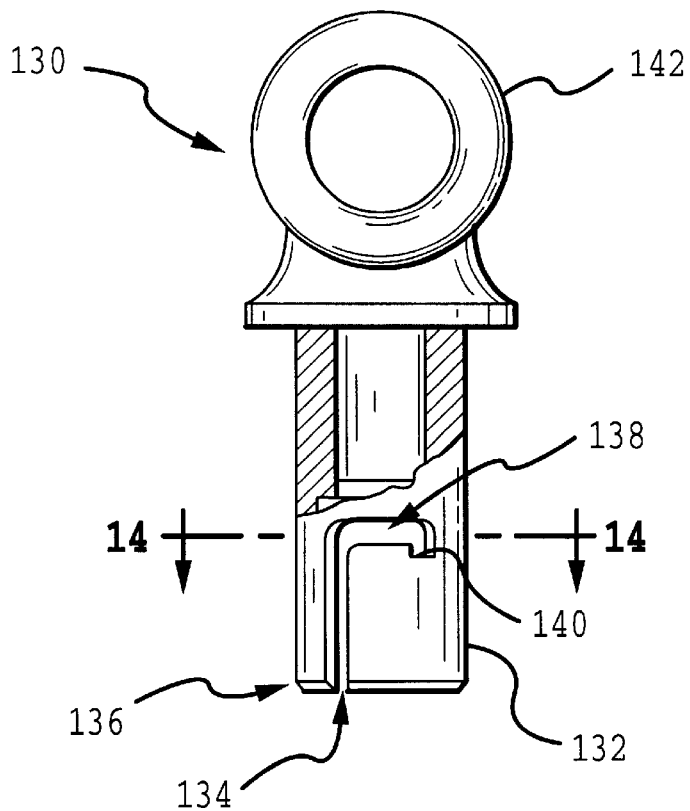
FIG. 13 is a side, partially cut-away view of a tie-down member of the auxiliary loading system illustrated in FIG. 12.
Figure 14:
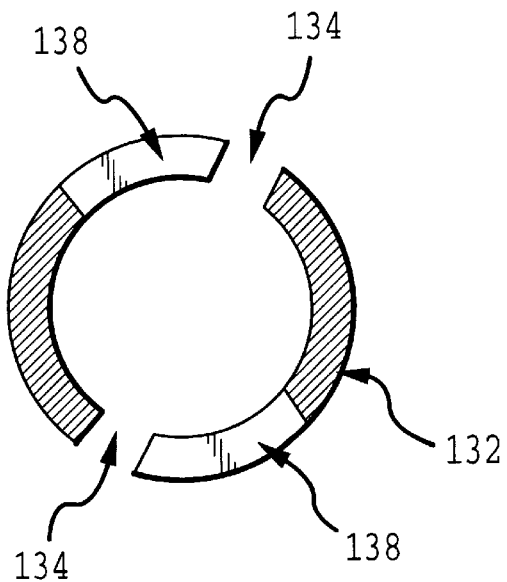
FIG. 14 is a cross-sectional view of the tie-down member illustrated in FIG. 13, taken along line 14—14.
Figure 15:
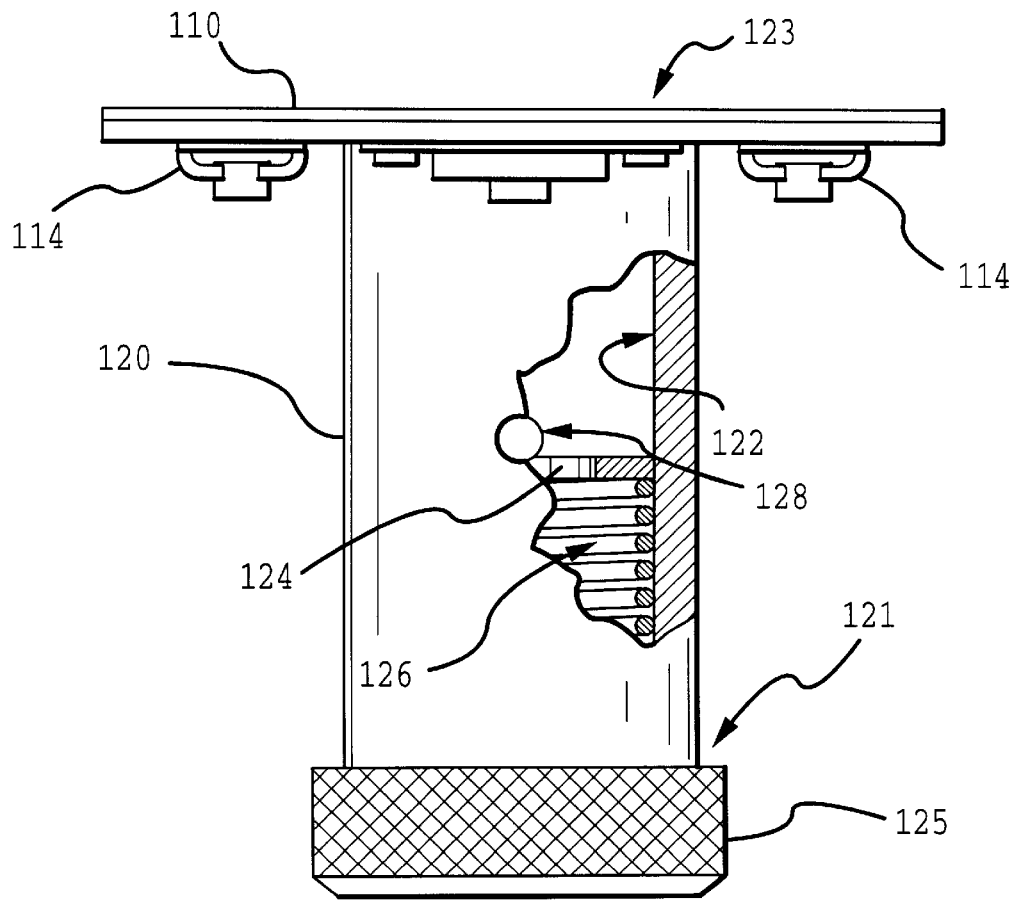
FIG. 15 is a side, partially cut-away view of a barrel insert illustrated in FIG. 12.
Figure 16:
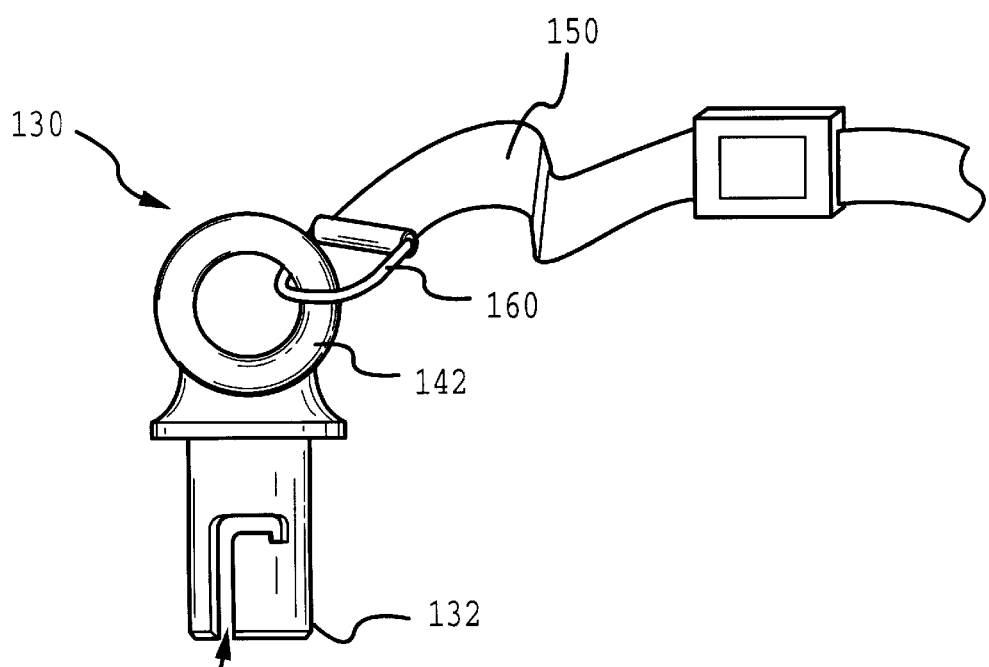
FIG. 16 is a perspective view illustrating a strap interconnected to a tie-down member.

In one embodiment, illustrated in FIGS. 13 and 16, for purposes of facilitating attachment of support members and/or patients, the tie-down member 130 includes an eyebolt 142, which threadedly engages the shaft portion 132 of the tie-down member 130. In this regard, support members and/or patients may be secured to the cargo floor platform 110 via the eyebolt 142. For example, a strap 150 attachable to a support member or extendable over a portion of a patient is interconnectable to the auxiliary loading system 100 via a clip 160 (e.g., O-ring, D-ring, C-ring, or other fastening element), which is interconnectable to the eyebolt 142, as illustrated in FIG. 16.

For purposes of providing a strong and durable interconnection between the cargo floor platform 110 and the support members and/or patient secured thereto, the cargo floor platform 110 may be fabricated from a high strength metal, such as aluminum, stainless steel or titanium. The floor platform 110 may be interconnected to the frame of the aircraft via a plurality of fasteners (e.g., NAS1581K3) and nut plates (e.g., NAS1474F3) (not shown). In addition, as the barrel insert 120 is insertable through corresponding bores 111 in the floor 110 and interconnectable to the cargo floor 110, in one embodiment, the barrel insert 120 is fastened to the cargo floor 110 via a plurality of high strength bolts 113 (e.g., #10 reduced head bolts (NAS1581-3-2)) and nut plates 114 (e.g., NAS1473F-3 nut plates). The barrel insert 120, specifically the body of the barrel insert 120 forming the bore 122, and the tie-down member 130, specifically the eyebolt 142 and the shank portion 132, may be fabricated from a high strength material, such as steel or titanium.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the claims be construed to include alternative embodiments to the extent permitted by the prior art.

What is claimed is:

1. A support system for use in a transport aircraft said support system comprising:

first and second support members having first and second widths, respectively, wherein said first width is different than said second width;

a floor platform having top and bottom surfaces laterally displaced side edges and longitudinally displaced front and back edges said floor platform positionable within the transport aircraft;

a plurality of tracks located about said top surface of said floor platform, wherein at least three of said plurality of said tracks are in a fixed position relative to each other upon installation of said floor platform into the transport aircraft, said at least three tracks providing at least two track pairs, wherein in said fixed position relative to each other only a first of said track pairs comprising only a first and a second of said plurality of tracks is spaced to supportably receive said first support member having said first width and only a second of said track pairs comprising only said first and a third of said plurality of tracks is spaced to supportably receive said second support member having said second width, wherein upon installation of said floor platform into the transport aircraft each of said first and second support members is supportably mountable to said floor platform free from repositioning of said plurality of tracks;

at least one access cover, interconnectable to said floor platform, for covering at least one opening in said floor platform; and at least one access cover track located about a top surface of said access cover, wherein said access cover track is adapted to receive one of said first and second support members and is substantially coincident with one of said plurality of tracks located about said floor platform.

2. A floor system, for use in a transport vehicle, capable of receiving at least one support member, comprising:

a floor platform having top and bottom surfaces, laterally displaced side edges and longitudinally displaced front and back edges, said floor platform positionable within the transport vehicle;

a plurality of tracks located about said top surface of said floor platform, wherein at least three of said plurality of said tracks are in a fixed position relative to each other upon installation of said floor platform into the transport vehicle, said at least three tracks providing at least two track pairs, wherein in said fixed position relative to each other a first of said tracks pairs comprising a first and a second of said plurality of tracks is spaced to supportably receive a first support member having a first width and a second of said track pairs comprising of first and a third of said plurality of said tracks is spaced to supportably receive a second support member having a second width;

at least one access cover, interconnectable to said floor platform, for covering at least one opening in said floor platform; and at least one access cover track located about a top surface of said access cover, wherein said access cover track is positioned to supportably receive one of said first and second support members and is substantially coincident with one of said plurality of tracks located about said top surface of said floor platform.

* * * * *

UNITED STATES PATENT AND TRADEMARK OFFICE
CERTIFICATE OF CORRECTION

PATENT NO. : 5,827,022
DATED : October 27, 1998
INVENTOR(S) : TOVANI

It is certified that error appears in the above-identified patent and that said Letters Patent is hereby corrected as shown below:

Item [54], the title of the application has been amended to delete the word "TIE-DOWN".
At Column 1, line 1, the title of the application has been amended to delete the word "TIE-DOWN".

Signed and Sealed this

Twentieth Day of April, 1999

Attest:

Q. TODD DICKINSON

Attesting Officer

Acting Commissioner of Patents and Trademarks